Nov. 21, 1944.       C. H. HODGKINS       2,363,326
ELECTRIC HEATING APPARATUS
Filed Dec. 12, 1940       4 Sheets-Sheet 1
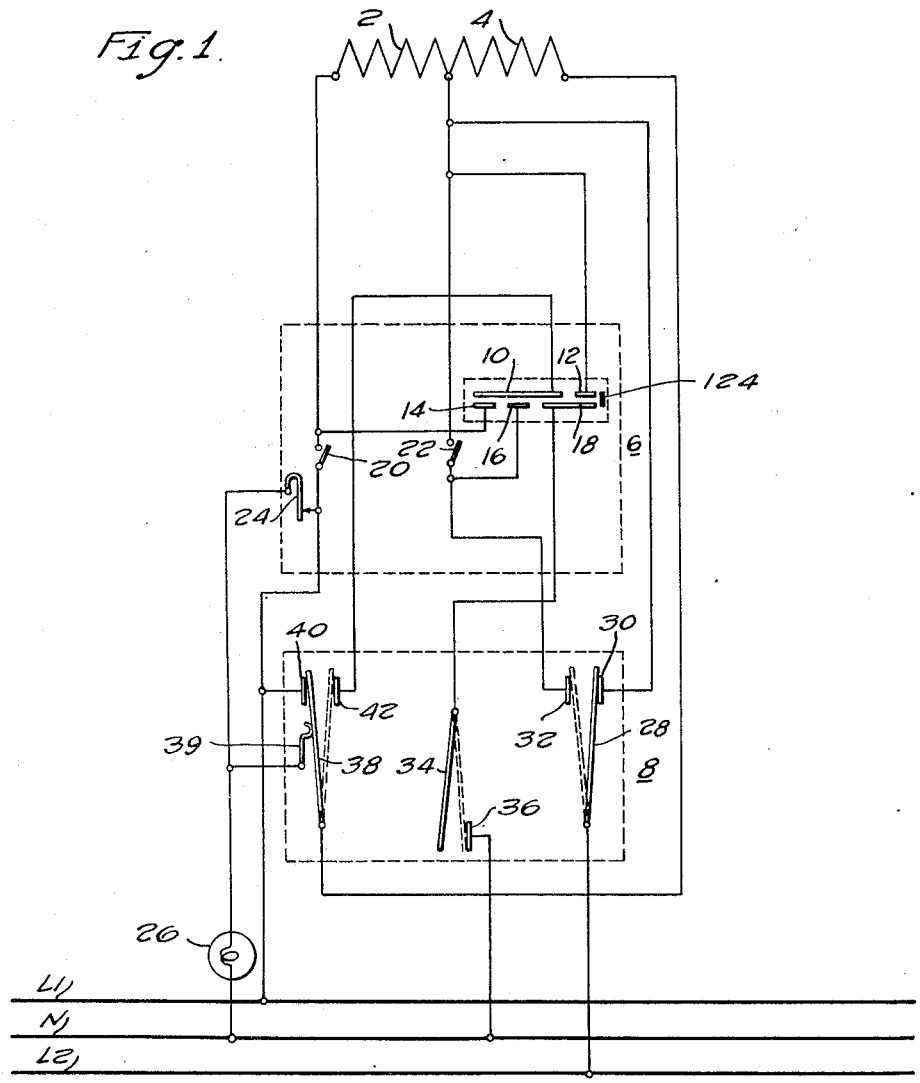
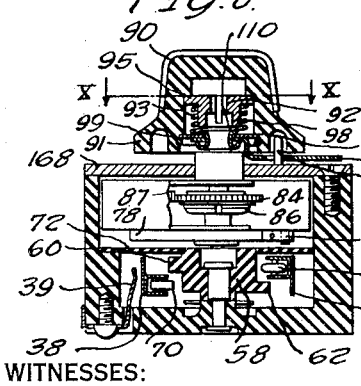
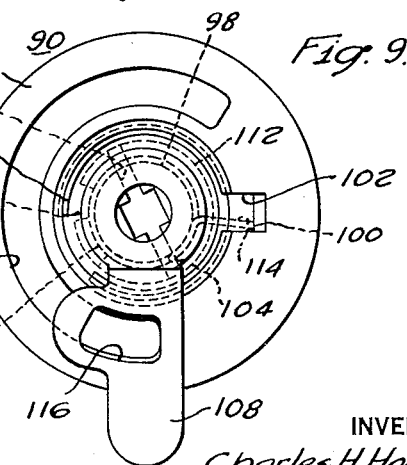
WITNESSES:
INVENTOR
Charles H. Hodgkins.
BY
ATTORNEY Nov. 21, 1944.   C. H. HODGKINS   2,363,326
ELECTRIC HEATING APPARATUS
Filed Dec. 12, 1940   4 Sheets-Sheet 2

WITNESSES:
E. A. McCloskey
A. T. Stratton

INVENTOR
Charles H. Hodgkins
BY
Ralph H. Swingle
ATTORNEY

Nov. 21, 1944.　　　　C. H. HODGKINS　　　　2,363,326
ELECTRIC HEATING APPARATUS
Filed Dec. 12, 1940　　　4 Sheets-Sheet 3

WITNESSES:
E. A. McCloskey
A. T. Stratton

INVENTOR
Charles H. Hodgkins.
BY
Ralph H. Swingle
ATTORNEY

Nov. 21, 1944.   C. H. HODGKINS   2,363,326
ELECTRIC HEATING APPARATUS
Filed Dec. 12, 1940   4 Sheets-Sheet 4

WITNESSES:
E. A. McCloskey
Q. T. Stratton

INVENTOR
Charles H. Hodgkins.
BY
Ralph H. Swingle
ATTORNEY

Patented Nov. 21, 1944

2,363,326

UNITED STATES PATENT OFFICE 2,363,326

ELECTRIC HEATING APPARATUS

Charles H. Hodgkins, Fairfield, Conn., assignor to Westinghouse Electric & Manufacturing Company, East Pittsburgh, Pa., a corporation of Pennsylvania Application December 12, 1940, Serial No. 369,819

6 Claims. (Cl. 219—20)

This invention relates to electric heating apparatus generally, and more specifically, to electric heating apparatus having both manual and time controls.

It has been found desirable, especially in heating apparatus used for cooking purposes, to first utilize a high intensity of heat for a predetermined period of time to preheat or sear the food being cooked, and thereafter to reduce the intensity of heat to a predetermined lower value.

Accordingly, one object of this invention is to provide electric heating apparatus having novel means for obtaining a high preheat, and for thereafter obtaining a preselected lower heat.

Another object of this invention is to provide electric heating apparatus having electric heating means with means for obtaining a high heat from said means for a preselected period of time, and for thereafter obtaining a preselected lower degree of heat from said means.

Another object of this invention is to provide a novel cooperation between electric heating elements and a source of electric energy capable of supplying different electromotive forces to one or more of said heating elements.

A still further object of this invention is to provide a novel electric circuit for connecting a plurality of resistor elements to supply conductors having different voltages in a plurality of different relations.

These and other objects of this invention will become more apparent upon consideration of the following detailed description of a preferred embodiment thereof, when taken in connection with the attached drawings, in which Figure 1 is a schematic view of one embodiment of novel heating apparatus constituting the invention, together with control means therefor;

Fig. 8 is a sectional view, taken substantially at right angles to Fig. 7, of the transfer switch portion of the control means;

Fig. 9 is an enlarged plan view of the inner face of the transfer control switch knob, with the indictator assembled therewith;

Figure 2:
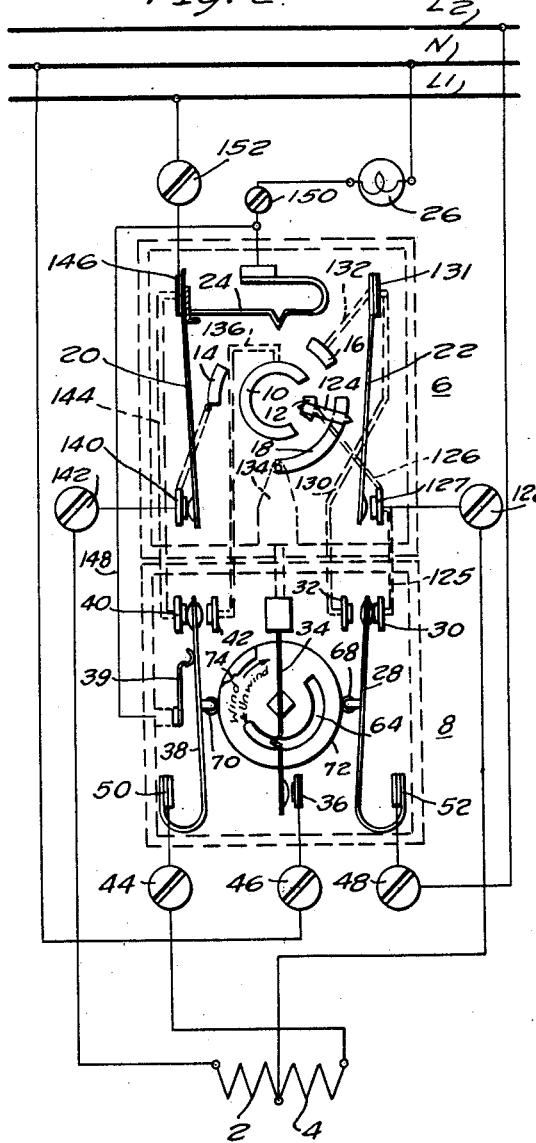
Fig. 2 is a view similar to Fig. 1, but showing the control means in greater detail and in one controlling position.
Figure 3:
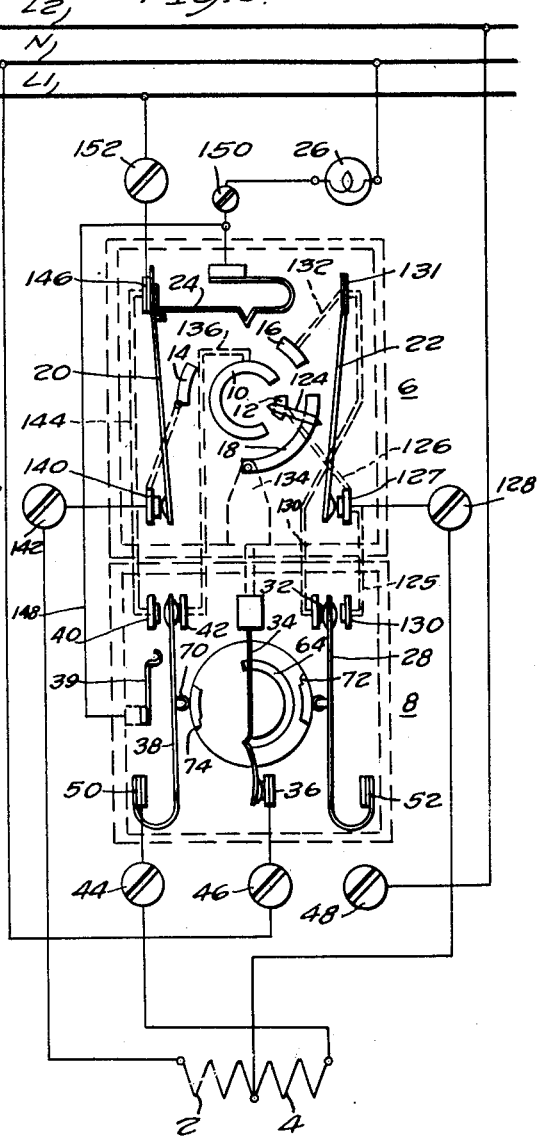
Fig. 3 is a view similar to Fig. 2, but showing the control means in another controlling position.
Figure 4:
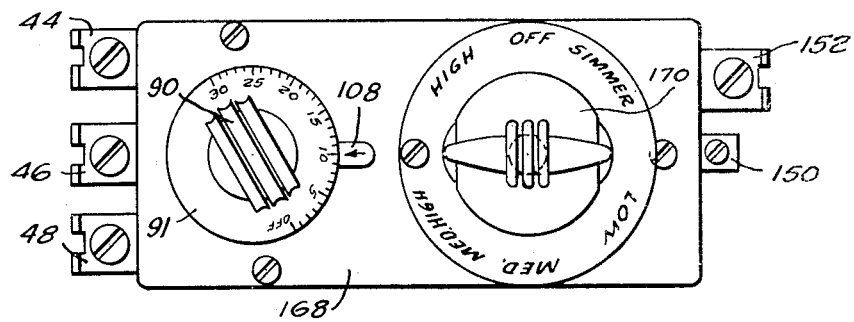
Fig. 4 is a plan view of one form of control means which may be used for controlling the heating apparatus illustrated in Fig. 1.

Referring to Fig. 1 of the drawings, there is illustrated a pair of resistor heating elements 2 and 4, respectively, connected to the three wires L1, N and L2 of a three-wire source of electric energy, by control means herein designated in two parts, that is, a selector control means 6 and a transfer control means 8. The selector control means 6 may be any desired type of control means capable of connecting the resistors 2 and 4 in a plurality of different series and parallel relations with respect to the three-wire source of energy. Preferably, however, the selector means is generally of the type shown in my copending application Serial No. 306,655, filed November 11, 1939, now Patent No. 2,331,191, issued October 5, 1943, and assigned to the Bryant Electric Company of Bridgeport, Connecticut. Such a selector means preferably comprises a row of selector contacts 10 and 12 and a spaced row of selector contacts 14, 16 and 18 adapted to be bridged by a bridging contact member 124 movable along the spaced rows of selector contacts in one direction, as will be hereinafter more fully described.

The selector control means 6 also includes a pair of disconnect switches 20 and 22, and these switches are preferably controlled relative to selector contacts 10 through 18, so as to always open the circuit before it is opened at selector contacts 10 to 18, and to close the circuit only when the selector contacts are bridged by bridging member 124. In the preferred embodiment of the invention, this sequential operation of the selector contacts and disconnect contacts is preferably accomplished by a single operating means which will be hereinafter described.

The transfer control means 8 is more particularly disclosed and claimed in my Patent No. 2,304,638, issued December 8, 1942. This transfer means generally comprises a pair of double throw switches 28 and 38, and a single throw switch 34. As shown, the end terminal of resistor 2 is directly connected to conductor L1 of the supply circuit by means of disconnecting switch 20 in the selector control means. The low voltage or neutral wire N of the supply source is connected by the contact 36 of the transfer single throw switch, to the selector control means 6. Double throw switch 28 of the transfer control means 8 has the blade thereof connected to high voltage wire L2 of the supply circuit, so that blade 28, when it engages contact 30, connects the common terminal of resistors 2 and 4 to supply conductor L2, and when switch blade 28 is in engagement with contact 32, it connects supply conductor L2 to the selector control means 6. Transfer switch 38 has the switch blade thereof connected to the end terminal of resistor 4 so as to connect this resistor to the selector control means 6 when the blade 38 is in engagement with contact 42, or to connect resistor 4 with supply conductor L1 when blade 38 is in engagement with contact 40. An indicating lamp 26 may be provided and controlled by a switch contact 39 positioned to be engaged by the transfer control switch 38, or by a switch 24 actuated by the selector control means, to indicate when either of these control means is in an active condition.

It will now be apparent that when the transfer control means 8 is adjusted so that switches 28, 34 and 38 are in the full line positions shown in Fig. 1 and disconnect switch 20 is closed, that resistors 2 and 4 will be connected in parallel between the high voltage pair of conductors L1 and L2 of the supply circuit. This obviously will provide the highest degree of heat possible from resistors 2 and 4 with a three-wire supply circuit having the conductors L1 and L2 capable of supplying a high voltage, for example, 230 volts, and the neutral conductor N in conjunction with conductor L1 or L2 capable of supplying a lower voltage, say 115 volts. This active position of the transfer switch means provides connections to the resistors 2 and 4 independent of selector switch contacts 10 through 18.

Preferably, the transfer switch blades 32, 34 and 38 are actuated in a predetermined sequence, and this may be accomplished preferably by the specific switch actuating means hereinafter described. It is understood, of course, that any desired actuating means may be used which will actuate switches 28 and 30 substantially simultaneously and, when moved to the full line position shown in Fig. 1, switch 34 should be opened prior to movement of switch blades 28 and 38 to their full line positions; and upon movement to the dotted line positions shown in Fig. 1, switch blades 28 and 38 should open prior to closure of switch 34. The reason for this sequence of operation of switch 34 on the one hand and switches 24 and 28 on the other hand, is that in the event an arc might be drawn between switch blade 38 and contact 40, for example, a short circuit might occur if switch blade 34 simultaneously moved into engagement with contact 36 and selector contacts 10 and 18 were bridged by an appropriate setting of the selector contact bridging means. This danger is not as acute when the transfer switches are moved from the dotted line positions to the full line positions shown in Fig. 1. However, in moving in the opposite direction even sequential operation of switch blades 32 and 34 may be insufficient to prevent a short circuit and, therefore, it is desirable that there be a time delay between the time when switch blade 38 moves out of engagement with contact 40, and the time of closure of switch blade 34 with contact 36. This may be obtained by any desired means, preferably by a timing means which is operable to move the transfer switches from their full line positions to their dotted line positions after a predetermined period of time, and there will be hereinafter disclosed a timing mechanism for accomplishing this purpose, wherein movement of the transfer switches from the full line to the dotted line position shown in Fig. 1, will always have to be accomplished by the timing mechanism so as to ensure a time delay and extinction of any arc which might be drawn when these switches are opened, and before they are moved to their dotted line positions.

With the transfer switches in the dotted line positions shown in Fig. 1, it is obvious that the degree of heat which will be produced by resistors 2 and 4 will be determined by which of the selector contacts 10 to 18, inclusive, are connected by the selector bridging means. In the arrangement shown, six positions are possible, including an off position, for providing five different degrees of heat under the control of the selector contacts 10 through 18. These are as follows:

| Positions | Closures | Loads |
| --- | --- | --- |
| 1—Off | All contacts open | 0. |
| 2—High | 20, 10-14, 22 closed | 2 and 4 in parallel on 230 volts. |
| 3—High-medium | 20 and 22 closed | 2 on 230 volts. |
| 4—Medium | 20 and 10-16 | 2 and 4 in series on 230 volts. |
| 5—Low | 20 and 12-18 closed | 2 on 115. |
| 6—Simmer | 20 and 10-18 closed | 2 and 4 in series on 115 volts. |

The pilot lamp 26 has its selector control switch 24 adapted to be closed at all active positions of the selector control means 6, and its transfer control switch 39 is adapted to be closed as shown, by switch blade 38 when the transfer control means 8 operates to energize the resistors independently of the selector control means 6. From the above, it will be noted that disconnect switch 20 is closed on all active positions of the selector control means 6 so that the end terminal of resistor 2 is, in effect, directly connected to supply conductor L1 in all active positions of the selector control means 6, and independently of the transfer control means 8. When the selector control means 6 is positioned at its off position so that all the contacts thereof are opened and the transfer control means 8 is adjusted to its active position, that is, to the position in which the switch blades are shown in full lines in Fig. 1, then only one resistor 4 will be connected to the high voltage pair of supply conductors L1, L2 so that the transfer control means 8 is then operable to energize the resistors only to a lesser predetermined high heat than when the selector control means 6 is adjusted to an active position. When the selector control means 6 is adjusted to an active position, however, the transfer control means 8 in its active position will be operative to connect resistors 2 and 4 in parallel with high voltage supply conductors L1 and L2 irrespective of which position the selector control means has been adjusted to.

Referring to Figs. 2 through 10 of the drawings, there is illustrated in detail a preferred form of control means for actuating the switching means shown in Fig. 1 in predetermined sequence. As shown, for example, in Figs. 4 through 8, the transfer control means 6 may be supported in an insulating casing 45 of any desired insulating material, preferably a molded insulating material, with the casing 45 having one open front face. Suitably secured on the bottom wall of the casing at one end thereof are terminals 44, 46 and 48 with the terminal 44 being adapted to be connected to the end terminal of resistor 4, as shown in Fig. 2. Terminal 46 is adapted to be connected to conductor N of the supply circuit and terminal 48 is adapted to be connected to conductor L2 of the supply circuit. Mounted within casing 45 at opposite sides thereof, respectively, are switch blade supports 50 and 52 conductively connected to terminals 44 and 48, respectively, for supporting switch blades 38 and 28. These switch blades are preferably of a resilient conducting material so as to be normally biased into engagement with fixed contacts 42 and 32, respectively, mounted in opposite corners of casing 45. Switch blades 38 and 28 may be moved into engagement with fixed contacts 40 and 30, respectively, and the fixed contacts 40—42 and 30—32 are provided in restricted arcing chambers formed by integral baffle members 54 in the casing, and by an insulating cover plate 72 overlying the baffles and contacts to form arc chambers of insulating material having an opening merely to accommodate movement of the switch blades 28 and 38. Terminal 46 is conductively associated with contact 36 shown in Fig. 7, adapted to cooperate with switch blade 34 mounted in the casing on the bottom wall thereof. It will be noted that the contact 36 is also positioned in a restricted arc chamber formed by a recess 56 in casing 45.

Switch blades 28, 38 and 34 are adapted to be actuated by a single cam member 58 in the form of a block of insulating material having a substantially central opening therethrough so as to be rotatably mounted on a shaft 59 secured in the bottom wall of the casing 45. Cam member 58 is circular in form, and is provided on its periphery with upper and lower cam surfaces 60—62 for actuating switch blades 28 and 38, respectively. By reference to Fig. 8, it will be noted that switch blades 38 and 28 are provided with relatively offset cam rollers 70 and 68, respectively, for cooperation with peripheral cam surfaces 62 and 60, respectively, on cam member 58. Cam member 58 is also provided with a recess 64 in its undersurface for cooperation with a struck-up portion 66 on switch blade 34, to actuate switch blade 34 in a predetermined sequence with respect to switch blades 38 and 28. Cam member 58 is provided in its upper surface with a pair of spaced sockets 74 adapted to receive a correspondingly spaced pair of driving prongs 76 fixed to the shaft 77 of a timing mechanism 80. The driving prongs 76 project through an opening in insulating plate 72 and are received in sockets 74 in the cam member for driving engagement therewith. Timing mechanism 80 is provided with a coil spring 78, one end of which is adapted to be connected to drive shaft 77 and the other end of which is connected to the timer frame as at 82. Drive shaft 77 has a gear 84 (Fig. 8) rotatably mounted thereon and frictionally secured for movement with the shaft by a resilient cup-shaped washer 86 keyed to the shaft and frictionally engaging gear 84. Gear 84 is adapted to mesh with a pinion gear 87 associated with escapement mechanism in a well known manner, mounted in the frame for timing mechanism 80.

Drive shaft 77 of the timer mechanism is provided with a squared portion 88 projecting outwardly from casing 45 for receiving an operating knob 90. Referring to Figs. 8 to 12, it will be apparent that operating knob 90 is hollow to receive the squared end 88 of the drive shaft and is provided with a peripheral flange 91 having suitable indicia provided on the outer surface thereof, preferably calibrated to indicate minutes of time. A drive collet 92 is positioned within the hollow of operating knob 90, and includes a sleeve portion 93 terminating in a flange portion 95. Sleeve portion 93 has a squared opening therethrough to accommodate the squared end 88 of drive shaft 77. Drive collet flange 95 is provided with a slot 96 in the edge thereof for receiving a key projection 94 integral with knob 90. It will be noted that key projection 94 is of considerable less extent than notch 96 so as to provide for a limited lost motion between the knob and drive collet 92, and consequently between the knob and drive shaft 73. A coil spring 98 is provided about the sleeve portion 93 of the drive collet, and one end 104 of the coil spring is bent to extend into a slot 106 formed in the base portion of the drive collet. The other end 100 of the coil spring is bent to extend substantially radially outwardly into a notch 102 provided in the flange portion 91 of operating knob 90. Coil spring 98 may be a relatively light spring since its function is merely to retain projection 94 on the knob in engagement with end wall 97 of notch 96 in the drive collet, and the force exerted by this spring should be considerably less than that exerted by spring 78 of the timing mechanism so that the drive collet may be moved relative to the operating knob by spring 78 in opposition to spring 98.

An indicator strip 108 is adapted to be assembled to knob 90 and, as shown, the indicator strip 108 is secured to a disk 112, for example, as by an eyelet 110 and the disk 112 is secured for rotation with the operating knob by having an integral key projection 114 thereof extended into slot 102 provided in operating knob flange 91. Disk 112 is maintained in operative relation with knob 90 by a split ring 99. Indicator strip 108 is not fixedly secured to disk 112 by eyelet 110, but this connection is preferably formed under just sufficient pressure to enable relative rotation of the indicator strip and disk 112 while maintaining these parts in frictional engagement. Indicator strip 108, as shown in Fig. 9, is provided in the portion thereof underlying flange 91 of the operating knob, with an arcuate shaped slot 116 adapted to coincide with a portion of arcuate slot 118 provided on the underside of flange 91 of the operating knob. A pin 120 fixed to the cover 168 for switch casing 45, is adapted to project through the opening 116 in indicating strip 108 into slot 118 in the operating knob.

Figure 10:
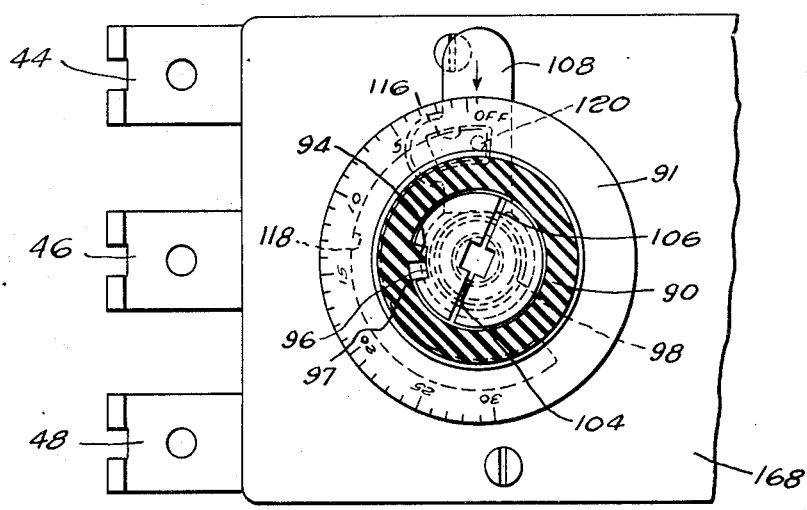
Fig. 10 is a transverse cross-sectional view through the transfer switch knob, taken substantially on the line X—X of Fig. 8.
Figure 11:
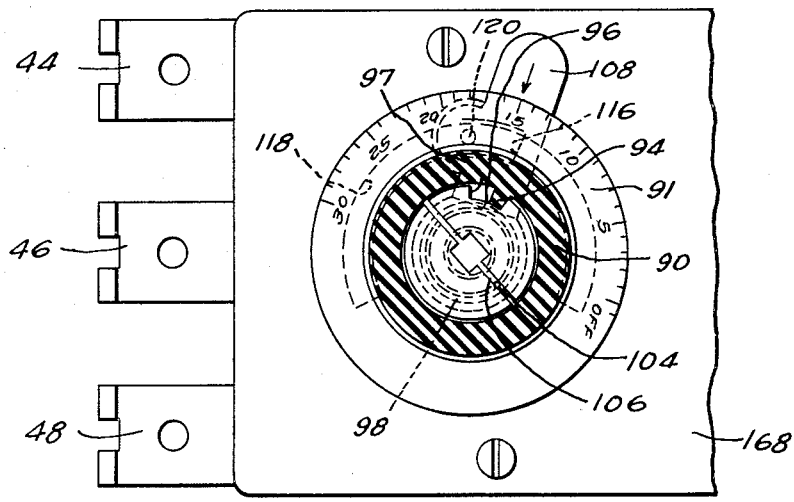
Fig. 11 is a view like Fig. 10, but illustrating a different position of the parts.
Figure 12:
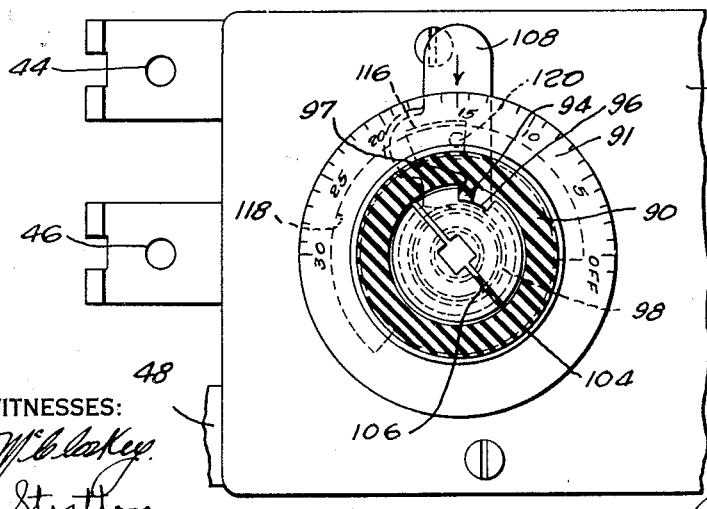
Fig. 12 is a view like Figs. 10 and 11 illustrating still a third position of the parts.

Referring now to Fig. 10 of the drawings, the operating knob and indicator are shown in the off position of the switch. In this position, it will be noted that pin 120 on the casing cover is in engagement with one end of the slot 118 in the knob and with one end of opening 116 in indicating strip 108. As viewed in this figure, spring 78 of the timing mechanism tends to rotate operating shaft 77 in a counter-clockwise direction. It will also be noted that spring 78 of the timing mechanism has rotated the drive collet until key projection 94 on the operating knob is positioned at the end of slot 96 in the collet which is opposite from end 97, thereby stressing coil spring 98 connected between the drive collet and knob. Now if it is desired to adjust the timing mechanism to connect the resistors independently of the selector control means so they will produce a high heat for a predetermined period of time, the operating knob 90 is grasped and manually rotated in a clockwise direction, for example, to the position shown in Fig. 11 where the knob has been rotated to a position to maintain the resistors at a high heat for a 15 minute period. It will be noted that when the knob is rotated from the position shown in Fig. 10 to the position shown in Fig. 11, the position of key projection 94 in slot 96 of the drive collet remains unchanged, but indicator strip 108 due to its friction mounting with respect to the operating knob, moves with the knob a distance determined by the length of the opening 116, to a position somewhat to the right of that shown in Fig. 10. Now when the operating knob is released after having been manually moved to the position shown in Fig. 11, coil spring 98 will cause the knob and indicating strip 108 to move backwards a distance determined by the length of opening 116 in indicating strip 108 and the length of slot 96 in the drive collet, to the position shown in Fig. 12. With the parts in this position, it will be observed that the timing mechanism spring 78 has been wound an amount sufficient to cause it to require 18 minutes to attain the position shown in Fig. 10. The operating knob and indicating means, however, have moved backwardly from this position so that a 15 minute period is indicated and when the knob driven by drive collet 92 indicates that the switch has attained its off position or at the end of 15 minutes, the timing mechanism will not as yet have driven shaft 77 to the position shown in Fig. 10 because of the lost motion between the timing shaft and operating knob. However, it will be noted that the cam surfaces formed on the periphery of operating cam 58 of the transfer switch are provided, respectively, with intermediate portions 72 and 74 between the high and low portions of each cam surface. These intermediate portions are positioned to move switch blades 38 and 28 to an off position intermediate their respective contacts, where they are not in engagement with any of the contacts, so that even though the drive shaft 77 has not reached the end of its movement when operating knob 90 indicates the switch as being off, the transfer switches nevertheless will be in an off position since they will be in engagement with cam portions 72 and 74 at this time. In the remainder of its movement which will require 3 minutes in the embodiment shown, drive shaft 77 will permit switch blades 38 and 28 of the transfer switch to move to the position shown in Fig. 5, and will thereafter move switch blade 34 into engagement with contact 36 to render the selector control means 8 operative to energize the resistor heating elements at the value predetermined by the setting of this control. During this latter movement, drive collet 92 will move relative to operating knob 90 to move end wall 97 of slot 96 in the drive collet away from key projection 94 until the opposite end wall of slot 96 engages key projection 94 and thereby stops rotation of drive shaft 77 in a counter-clockwise direction.

Due to the friction clutch between gear 84 and drive shaft 77, it is possible to manually move indicating knob 90 backwardly from an adjusted position to its off position. However, as previously stated in connection with Fig. 1 of the drawings, this action might take place so rapidly as to cause a short circuit by way of transfer switches 34 and 38. It will be observed accordingly that by means of the lost motion connection described above between the operating knob 90 and drive shaft 77 of the timer mechanism, it will be impossible to move the shaft 77 by means of operating knob 90 to throw switch blades 28 and 38 from engagement with contacts 30 and 40, respectively, into engagement with contacts 32 and 42. Thus, for example, if the operating knob 90 is moved in a counter-clockwise direction from the position shown in Fig. 12 as far as possible, it will be observed that this only moves drive shaft 77 to the point where cam portions 74 and 72 engage the cam rollers on blades 38 and 28, respectively, to move them to an open position; and transfer to the other contacts can be accomplished only by movement of drive shaft 77 by timer spring 78, at a rate predetermined by the escapement mechanism, the distance required to move end wall 97 of the slot 96 in the drive collet from engagement with key projection 94 on the knob until the other end wall of slot 96 engages key projection 84.

The selector switch illustrated in Figs. 4 to 7 is substantially the same as that disclosed in applicant's above-mentioned copending application, and for a complete description of the parts thereof, as well as its specific mode of operation, reference is hereby made to said copending application. As shown in these figures, the selector control means 8 is supported in a shallow open top casing 122, having the selector contacts 10 through 18 mounted in concentric rows substantially about the center of casing 122. Disconnecting switches 20 and 22 are also located in casing 122 at opposite sides thereof, with the switch blades being mounted on supports 146 and 131, respectively, and, like blades 38 and 28 of the transfer switch, preferably of a resilient conducting material normally biased into engagement with their respective contacts 140 and 127. It will be noted that this switch casing is also provided with integral baffle means 164 which, in cooperation with insulating plate 166 across the top of contacts 127 and 140, substantially encloses the arcing space between the contact portion of switch blades 20 and 22 and their cooperating contacts. A single operating cam 154 is provided with a pair of upper and lower peripheral cam surfaces, similar to the surfaces of cam 58, but of different configuration, to actuate switch blades 20 and 22, respectively, and the underside of cam member 154 is provided with a recess 160 for receiving a coiled compression spring 162 engaging in the bottom of the recess and with bridging contact 124 which is thereby movable with the cam member to successively bridge selector contacts 10 to 18, when the cam member is rotated with its supporting shaft 156. The supporting shaft 156 has a squared portion adapted to be received in a square aperture in cam member 154 and be rotatably mounted in casing 122.

As previously stated, by properly positioning the raised and depressed portions of cam surfaces on the periphery of cam member 154, disconnecting switch blades 20 and 22 may be made to operate to open the circuit in predetermined relation with respect to the movement of bridging contact 124 over selector contacts 10 through 18. This relation is made to be such that one, or both, of the disconnecting switches is always operated to first open the circuit before bridging contact 124 moves from bridging relation with respect to one set of selector contacts, and so that the disconnecting switches always operate to close the circuit only after the bridging contact moves into bridging relation with respect to a succeeding set of selector contacts. This obviously will relieve the selector contacts and cooperating bridging contact 124 from all arcing, and confine the arcing, when the circuit is actually made or broken, to confined arcing chambers having walls of an insulating material.

Selector operating cam 154 is provided with a projection 158 adjacent its upper surface for controlling indicating lamp switch 24, and transfer switch blade 38 when moved into engagement with its cooperating contact 40 engages indicating lamp contact 39 all as previously described.

By reference to Figs. 2 through 7, the circuit from the source of electrical energy through the specific control means illustrated to the resistors may be easily traced. Thus, terminal 44 of the transfer switch is adapted to be connected to the end terminal of resistor 2, and this terminal is connected through the bottom wall of casing 45 with switch blade support 50; transfer switch terminal 46 is adapted to be connected to the low-voltage wire N of the supply source, and this is connected through casing 45 with contact 36. Terminal 48 of the transfer switch is adapted to be connected to conductor L2 of the supply source, and this is associated through the bottom of casing 45 with support 52 for switch blade 28. Between the transfer controlling means and selector controlling means, it can be seen that contact 30 of the transfer control switch is connected through the bottom of transfer casing 45 with conducting strip 125 to contact 127 of the selector control, and by conducting strip 126 to selector contact 12. Contact 32 of the transfer control is connected by conducting strip 130 to switch blade support 131 of the selector control, and by conductor strip 132 to selector contact 16. Transfer switch blade 34 similarly is connected by conducting strip 134 to selector contact 18. Transfer switch contact 42 is connected by conducting strip 136 to the selector contact 10, and transfer contact 40 is connected by conductor 144 extending alongside the control casings with disconnecting switch blade support 146. Terminals are provided on the selector control means 8 as follows: terminal 142, connected with disconnect contact 140, is adapted to be connected to the end terminal of resistor 2; terminal 128, connected to disconnect contact 127, is adapted to be connected to the common terminal of resistors 2 and 4; and terminal 152 associated with disconnecting switch blade 20 is adapted to be connected to the conductor L1 of the supply source. The conductor 148 is provided about the side and end of the control casings for connecting indicating lamp switches 24 and 39.

Figure 5:
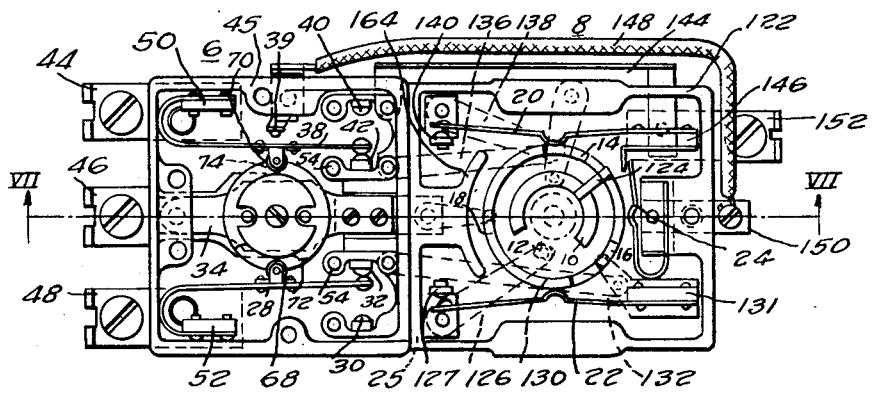
Fig. 5 is a plan view of the control means shown in Fig. 4, with the cover plate removed.
Figure 6:
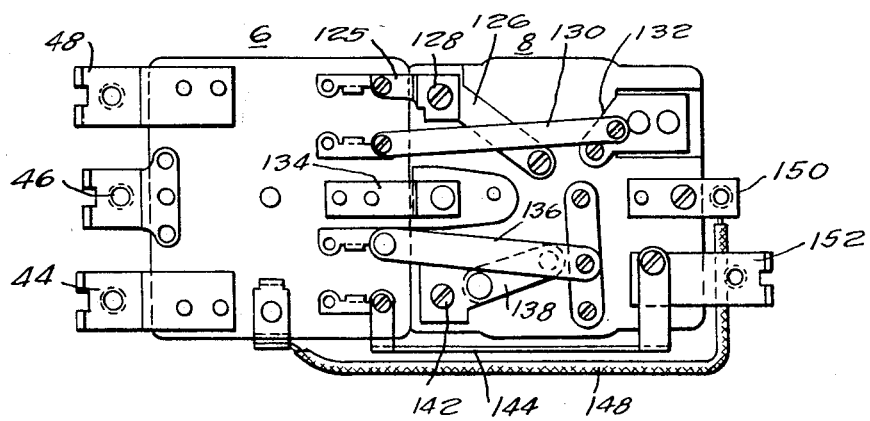
Fig. 6 is a bottom view of the control means shown in Figs. 4 and 5.
Figure 7:
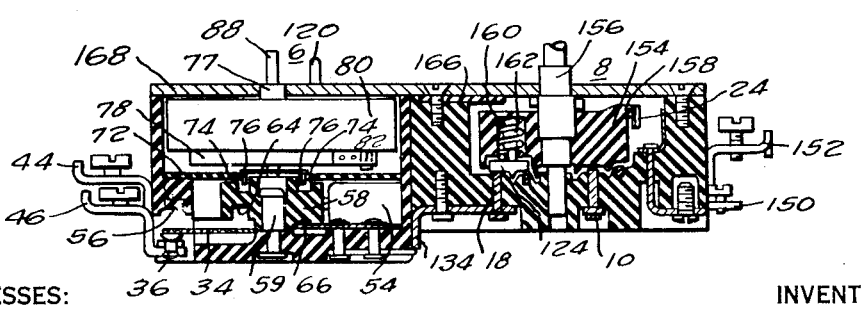
Fig. 7 is a transverse sectional view of the control means shown in Figs. 4, 5 and 6, and taken substantially on the line VII—VII of Fig. 5.

It will be observed that the terminals for the control means shown in Figs. 5 to 7, as well as most of the conductors connecting the transfer switch casing to the selector switch casing, lie in slots in the bottom walls of these casings, with two of the conductors 148 and 144 extending along one side of the casings.

It can be readily seen that the particular control means described above is especially compact and efficient in that all of the switching is done by merely two control members, that is, operating knobs 90 and 170, and all of the current interrupting contacts are located within enclosed arc chambers. In order to mechanically secure the transfer control means casing 45 to the selector casing 122, a single cover plate 168 is provided to extend over both casings and be secured thereto, to not only cover the open sides of the casings, but also to secure the casings in assembled relation.

It is believed that the operation of the specific control means described will be understood from the operation of the separate parts thereof given above. However, a brief resume of the operation of the entire system follows: With the transfer switches in their dotted line positions, as shown in Fig. 1 (full line positions Fig. 3), it is obvious that the selector knob 170 may be adjusted to any desired position to give any desired degree of heat from resistors 2 and 4, according to the table of positions previously set forth. In Fig. 2, the selector switch is adjusted to the low heat position. However, with the selector switch knob moved to a predetermined heating position, for example, the position shown in Fig. 2, the transfer operating knob 90 may be actuated to get the maximum heat from resistors 2 and 4 for any desired period of time, and as that period of time approaches its end, the transfer disconnect switches 38 and 28 are first moved to open circuit position, while the knob 90, in conjunction with indicator plate 108, indicates that the switch is in off position. However, transfer of the contacts to the dotted line positions shown in Fig. 1, (full line positions of Fig. 3), does not occur until a predetermined short period of time thereafter, followed by closure of transfer switch 34. This conditions the circuit so that the resistors will deliver the amount of heat for which the selector switch is set. Also, if at any time the operator changes his or her mind with respect to the setting of the transfer switch, it may be manually moved to any other desired time setting or to the off position, but such manual movement to the off position will not throw the transfer switches 28 and 38 from the full to the dotted line positions (Fig. 1), but can only operate to move these switches to an intermediate or open circuit position, it being necessary that the final movement of the switch blades 28 and 38 to the dotted lines shown in Fig. 1 be made by the timing mechanism, and it is impossible to do this by a manual operation. When the selector switch is at its off position, the transfer switch may be moved to its active position for any preselected period of time. However, under these circumstances, the resistor elements are not both connected in parallel with the high-voltage pair of supply conductors, as is the case when the selector control means has been moved to a selected heating position, but only one resistor is connected to the high-voltage pair of supply conductors so that a lesser high degree of heat is produced by the resistors when the transfer control means is moved to its active position and the selector is at its off position.

It will be obvious from the foregoing that there is disclosed herein novel electric heating apparatus wherein it is possible to obtain from electric heating means a predetermined high value of heating for a preselected period of time, after which the heat generated in the heating elements will be that which has been preselected; and this is accomplished, for example, with a three-wire supply circuit by connecting one of the high-voltage supply wires directly to the heating means through a disconnecting switch, and controlling the connection of the other high-voltage supply wire to shift it either to the resistors or to a selector means. Moreover, the circuit is arranged in a manner such that the switching may take place in a manner to prevent the application of any short circuits to the supply conductors. This novel circuit is also arranged in a manner such that different degrees of heat will be produced by the heating elements under the influence of the time controlled switching means depending upon whether the selector means effective at the end of the time period is adjusted to an active or to an inactive position.

Having described preferred embodiments of the invention in accordance with the patent statutes, it is desired that the invention be not limited to the particular embodiment described herein, inasmuch as it will be obvious to those persons skilled in the art that many changes and modifications may be made in this particular embodiment without departing from the broad spirit and scope of the invention. Therefore, it is desired that this invention be interpreted as broadly as possible, and that it be limited only by the prior art and by the following claims.

I claim as my invention:

1. In heating apparatus, the combination of a plurality of resistor elements, a plural wire supply circuit having different pairs of conductors energized, respectively, at different voltages, connections between said supply circuit and resistor elements including selector switch means having an "off" position and a plurality of operative positions at which at least some of the wires of said supply circuit are connected to said resistor elements in a plurality of different relations to obtain different heating effects therefrom, means connecting one wire of the higher voltage pair of supply wires to said resistor elements by a disconnecting means, transfer switch means in certain of said connections between said supply circuit and said selector switch means and resistor elements for selectively connecting the other wire of said pair of high voltage supply wires to said resistor elements or to said selector means manually adjustable timing means operatively associated with said transfer switch means for selecting the time said transfer switch means connects said other high voltage supply wire and resistor elements, after which said timing means adjusts said transfer switch means to connect said other supply wire to said selector means, and common operating means for said selector switch means and disconnecting means to close said disconnecting means at operative positions of said selector switch means and to open said disconnecting means at the "off" position of said selector switch means, whereby said timing means when adjusted is effective to connect said resistor elements in different circuits with said supply conductors depending upon whether said selector switch means is at an operative position or at its "off" position.

2. In heating apparatus, heating means including a pair of resistor elements, a three-wire supply circuit having different pairs of conductors thereof energized, respectively, at different voltages, connections between said supply circuit and resistor elements including selector switch means adapted to connect high and low voltage supply conductors to said resistor elements in different relations, said selector switch means having an "off" position and a plurality of operative positions at which said supply wires are connected to said resistors in a plurality of different relations, respectively, the connection of one high voltage supply conductor to one of said resistor elements including disconnecting means, common actuating means for said selector switch means and disconnecting means so that said disconnecting means is maintained in closed position at each selected operative position of said selector means and operated to open said connection when said selector means is moved to its "off" position, transfer switch means in certain of said connections between said supply circuit and said selector switch means and resistance elements adapted in one position thereof to connect the other of said high voltage supply conductors to both of said resistor elements and said one high voltage supply conductor to the other of said resistor elements, and in a second position open said circuits and connects said other high voltage supply conductor to said selector means, and adjustable timing means operatively associated with said transfer switch means for adjusting said transfer switch means to said one position for a predetermined period of time at the end of which said transfer means is movable to said second position, whereby when said selector means is at an operative position said timing means may be adjusted to energize said heating means at the maximum rate for a predetermined time after which said heating means will be energized at the rate determined by the setting of said selector means, and when said selector means is at its off position, said timing means when adjusted will energize said heating means at a lower rate for a predetermined time after which said heating means is deenergized.

3. In electric heating apparatus, the combination of resistance means energizable at different rates for providing different degrees of heating, first means connected with said resistance means for normally controlling energization of said resistance means and movable to a plurality of selective positions corresponding to different degrees of heating of the resistance means and to an off position, second means connected with said first means and with said resistance means for controlling energization of the resistance means and movable manually to an active position wherein said resistance means is energized at a predetermined high rate when said first controlling means is adjusted to any one of said plurality of selective positions, and at a predetermined lower rate when said first controlling means is at its off position, and adjustable timing means operatively associated with said second means for rendering the second controlling means inactive after a predetermined period of operation and for conditioning the resistance means for energization at the rate determined by the adjustment of the first controlling means.

4. In electric heating apparatus, the combination of resistance means energizable at different rates for providing different degrees of heating, first means connected with said resistance means for normally controlling energization of said resistance means and movable to a plurality of selective positions corresponding to different degrees of heating of the resistance means and to an off position, second means connected with said first means and said resistance means for controlling energization of the resistance means and movable manually to an active position wherein said resistance means is energized at a rate substantially equal to the highest degree of heat obtainable by said first means when said first controlling means is adjusted to any one of said plurality of selective positions, and at a predetermined lower rate when said first controlling means is at its off position, and adjustable timing means operatively associated with said second means for rendering the second controlling means inactive after a predetermined period of operation and for conditioning the resistance means for energization at the rate determined by the adjustment of the first controlling means.

5. In heating apparatus, the combination with a plural conductor source of electrical energy and resistance means energizable at different rates for providing different degrees of heating, of first means for controlling energization of said resistance means and selectively movable to a plurality of operative positions and an "off" position, electrical connections connecting said first control means in circuit with said resistance means and said source of electrical energy so that said resistance means will be energized at different rates at said operative positions of said first control means, respectively, second means controlling energization of said resistance means having at least two operative positions, electrical connections from said second control means to said source of electrical energy, to said resistance means and to said first control means so that at one position of said second control means said resistance means is energized at one predetermined rate when said first control means is at an operative position and at a different predetermined rate when said first control means is at its "off" position, said second means at its other operative position conditioning said resistance means for energization at the rate determined by the position of said first means, and adjustable timing means for actuating said second control means from said one operative position to the other at the end of the period of time for which it is adjusted.

6. In heating apparatus, the combination with a plural conductor source of electrical energy and resistance means energizable at different rates for providing different degrees of heating, of first manually adjustable means for controlling energization of said resistance means and selectively movable to a plurality of operative positions and an "off" position, electrical connections connecting said first control means in circuit with said resistance means and said source of electrical energy so that said resistance means will be energized at different rates at said operative positions of said first control means, respectively, second means controlling energization of said resistance means having at least two operative positions, electrical connections from said second control means to said source of electrical energy, to said resistance means and to said first control means so that at one position of said second control means said resistance means is energized at one predetermined rate when said first control means is at one operative position and at a different predetermined rate when said first control means is at its "off" position, said second means at its other operative position conditioning said resistance means for energization at the rate determined by the position of said first means, and manually adjustable timing means for actuating said second control means from said one operative position to the other at the end of the period of time for which it is adjusted.

CHARLES H. HODGKINS.